United States Patent [19]

Burge

[11] 4,413,540
[45] Nov. 8, 1983

[54] FOAM PEELING PROCESS AND APPARATUS

[75] Inventor: Russell W. Burge, Covina, Calif.

[73] Assignee: Mobay Chemical Corporation, Pittsburgh, Pa.

[21] Appl. No.: 332,284

[22] Filed: Dec. 18, 1981

[51] Int. Cl.³ .......................................... B23Q 37/00
[52] U.S. Cl. ................................. 82/47; 144/209 R; 144/365; 156/255
[58] Field of Search ........................ 144/209 R, 365; 156/255; 82/47

[56] References Cited

U.S. PATENT DOCUMENTS

| | | | |
|---|---|---|---|
| 3,223,568 | 12/1965 | Alderfer | 156/255 |
| 3,874,988 | 4/1965 | Buff | 161/165 |
| 4,022,647 | 5/1977 | Yevick | 156/255 |
| 4,243,617 | 1/1981 | Burge | 264/39 |
| 4,243,625 | 1/1981 | Burge | 264/120 |
| 4,351,379 | 9/1982 | Hasegawa | 144/365 |

FOREIGN PATENT DOCUMENTS 729955 3/1966 Canada ........................... 144/209 R
1228393 11/1966 Fed. Rep. of Germany ... 144/209 R

OTHER PUBLICATIONS

Edge Saw Mfg. Co. Brochure ES 5-30-72.
Fecken-Kerfel KG-Engineering and Machine Co., brochure entitled "Bandknife Peeling Machines".

*Primary Examiner*—W. D. Bray
*Attorney, Agent, or Firm*—Gene Harsh; Joseph C. Gil

[57] ABSTRACT

The present invention relates to a novel foam peeling process and apparatus. The process and apparatus allow for the substantially continuous production of a continuous sheet of foam material in roll form from a cylindrical foam body. By following the present invention, several basic operations may be performed on a foam body including inserting a supporting rod in the foam body, bringing a cutting element into contact with the foam body while it is rotating on the supporting rod, winding the resultant continuous foam sheet and returning the supporting rod back to the inserting station. The invention allows for the production of a foam roll in a substantially continuous manner with a minimum amount of labor. Furthermore, all the various operations can be controlled via suitable electrical control means, and it is preferable that all the various operations be programmed into a single control unit.

14 Claims, 20 Drawing Figures

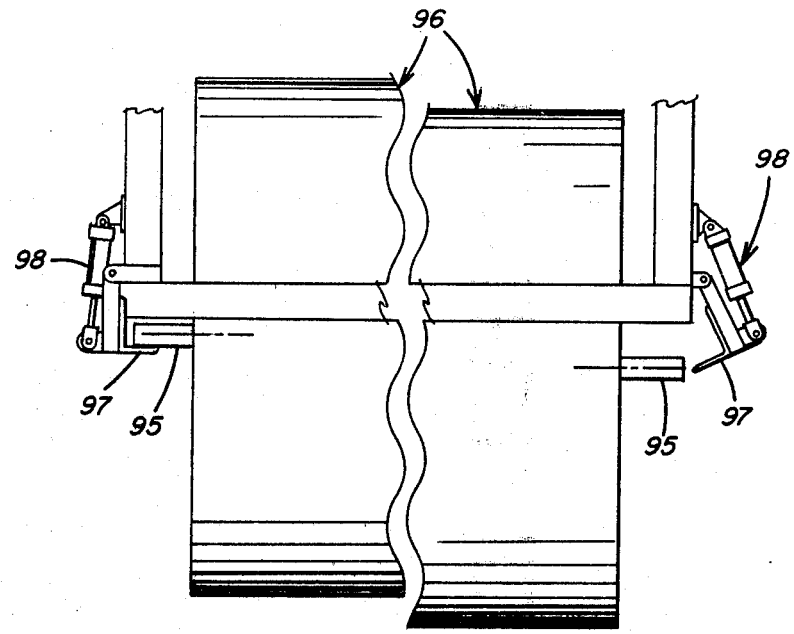
FIG. 12A
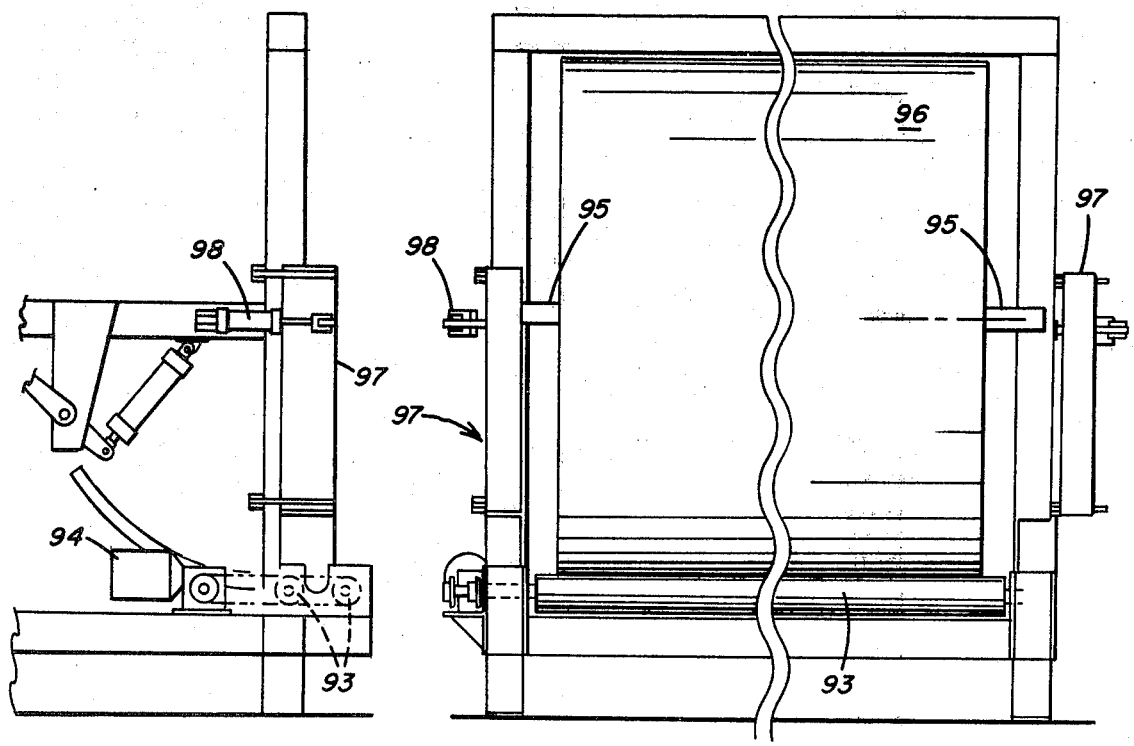
FIG. 12B
FIG. 12

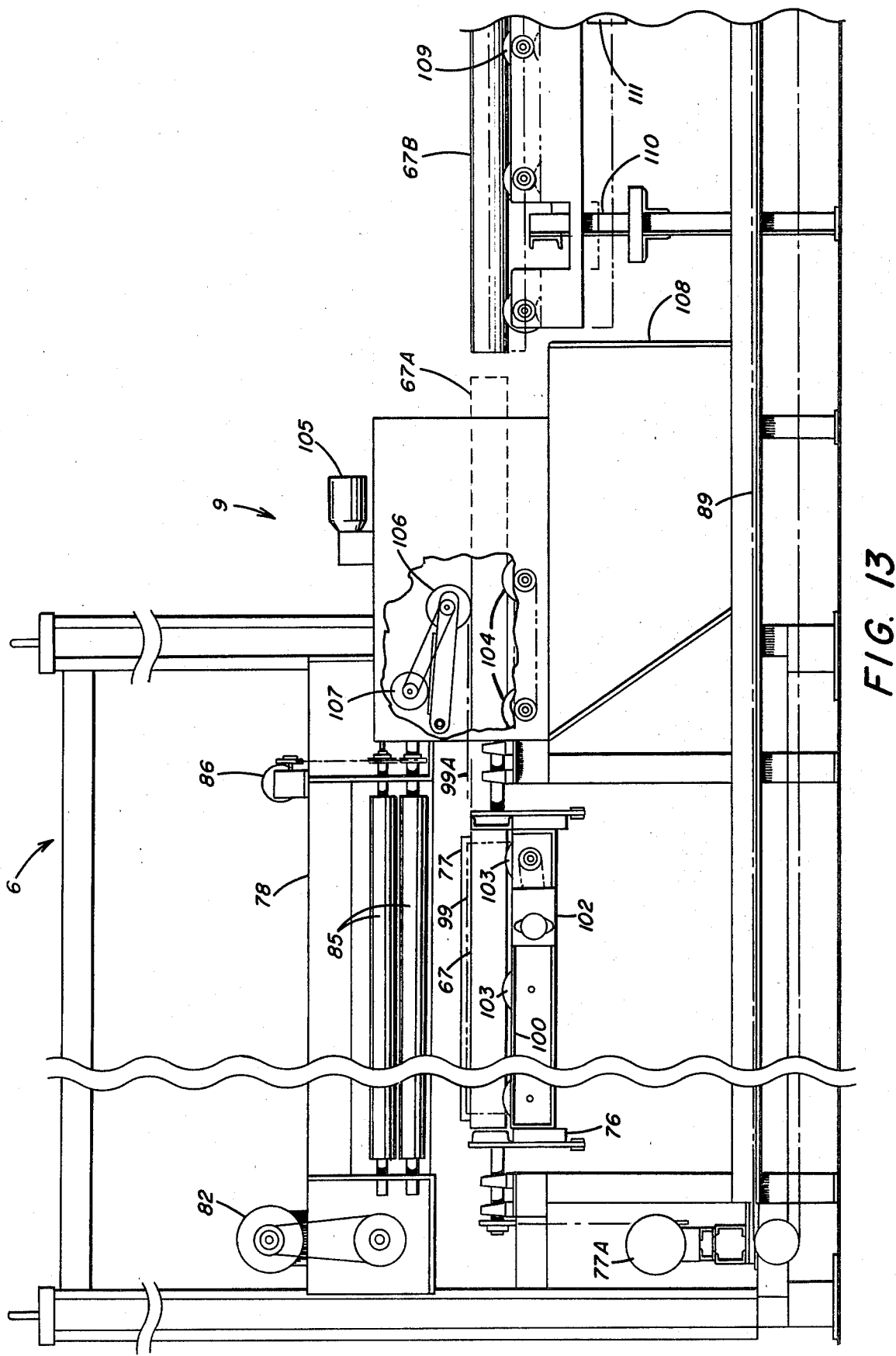

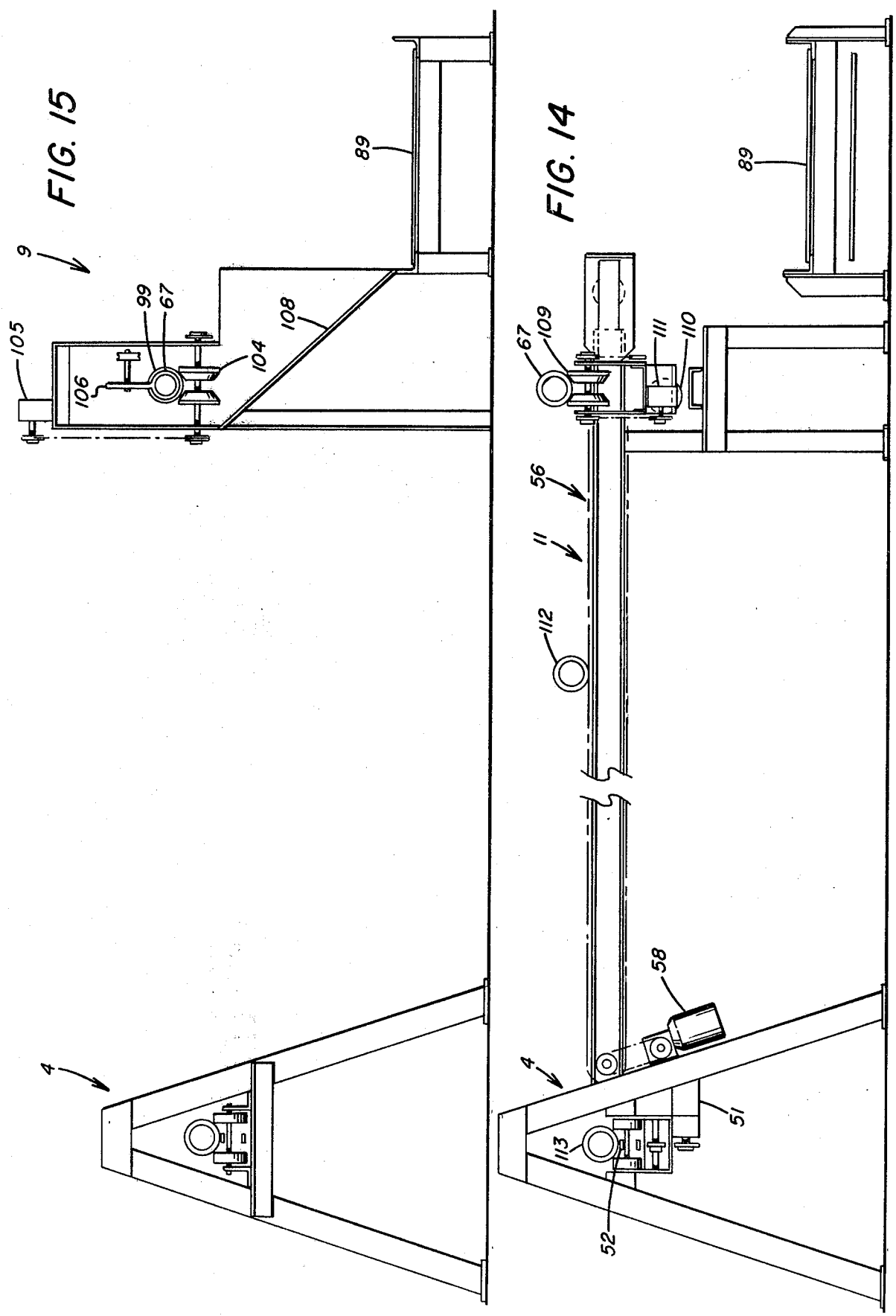

FOAM PEELING PROCESS AND APPARATUS

BACKGROUND OF THE INVENTION

A substantial amount of the materials used for carpet underlay are produced from rebonded flexible organic foam and preferably rebonded polyurethane foam. Rebonded foam is generally obtained by a process which broadly consists of applying a binder to small particles of foam, compressing the resultant mix and allowing the binder to fully cure.

In manufacturing rebonded foam and particularly polyurethane foam, foam particles are placed in a suitable mixing container, such as a ribbon blender, where the foam particles are subjected to vigorous mixing. As the foam pieces are being agitated, a binder is sprayed into the mixing container. After the foam and binder are thoroughly blended, the mixture is transferred to a mold and compressed. The mixture is held in the compressed state until the resultant product is dimensionally stable. The resultant product may then be fabricated into whatever shape is required for the particular end use application.

The molding process generally produces a cylindrical roll or log of rebonded polyurethane foam.

These rolls or logs are then cut into sheet material. The molding procedures generally known in the art suffer many disadvantages common to batch operations including high cost and relatively low production costs. Additionally, significant problems are generally encountered relative to product characteristics such as uniformity of density, scrap loss, and reproducibility.

One process available commercially consists broadly of the following steps: filling a mold with a mixture of foam and binder, compressing the mixture, curing the binder while the mixture is in the compressed state, drilling a hole in the cured product and removing the mold from the product. Since so much of this process is dependent on human factors, one serious problem was the relatively low yields obtained since the process is directly dependent on how fast the human worker could move the mold from station to station.

Substantially all the problems noted above were solved by the invention described in U.S. Pat. Nos. 4,243,617 and 4,243,625, and the disclosures of which are herein incorporated by reference. While the inventions described in the above-noted patents substantially increased the production rate for rebonded foam, they also created a bottleneck in the overall production of foam sheets. More particularly, although rebonded foam cylinders were produced at a high rate, the subsequent peeling operation was still essentially a labor intensive operation with the end result that a substantial amount of rebonded foam had to be stored to await subsequent peeling.

Although peeling equipment has been described (see, e.g., U.S. Pat. Nos. 3,874,988 and 3,223,568), and is commercially available from companies such as Edge Saw Manufacturing Co. (see brochure No. E.S. S-30-72) and Fecken-Kirfel KG—Engineering and Machine Co. (see brochure entitled "Bandknife Peeling Machines"), there is not presently available a complete operation for the substantially continuous production of foam in sheet form from a cylindrical roll or log. The present invention fills this need.

BRIEF DESCRIPTION OF THE DRAWINGS

FIG. 12 is a view of FIG. 3 along line XII—XII showing the winding station.

FIG. 12 A is a top view of FIG. 12, and FIG. 12 B is a side view of FIG. 12.

FIG. 13 is a view of FIG. 3 along line XIII—XIII, showing completion of the peeling operation, removal of scrap foam from a supporting rod and delivery of a supporting rod to a transporting means for delivering a supporting rod back to the supporting rod insertion station.

FIG. 14 is a view of FIG. 3 along line XIV—XIV showing the delivery of a supporting rod to the supporting rod insertion station.

FIG. 15 is a view of FIG. 3 along line XV—XV, showing one supporting rod in the foam removal station and another supporting rod at the supporting rod insertion station.

BRIEF DESCRIPTION OF THE INVENTION

Figure 1:
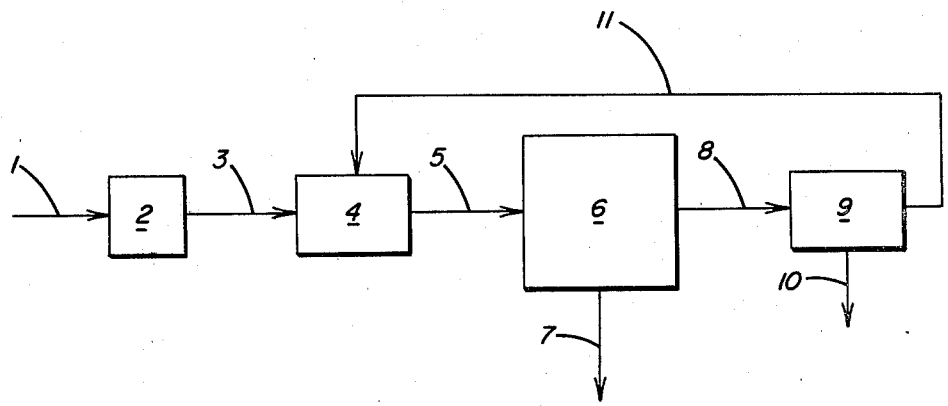
FIGS. 1 and 2 represent schematic diagrams illustrating two embodiments of the present invention.

The present invention relates to a novel foam peeling process and apparatus. The invention allows for the substantially continuous production of a continuous sheet of foam material in roll or wound form from a cylindrical foam body. By following the present invention, several basic operations may be performed on several foam bodies substantially simultaneously including inserting a supporting rod through the foam body, bringing a cutting element into contact with a foam body while it is rotating on a supporting rod, winding the resultant continuous foam sheet, and returning the supporting rod back to the inserting station. The invention allows for the production of a foam roll in a substantially continuous manner with a minimum amount of labor and at a rate not heretofore attainable.

The process of the present invention broadly comprises:

(A) transporting a cylindrical foam body to a first station, (B) at said first station, inserting a supporting rod through the longitudinal axis thereof, (C) transporting a cylindrical foam body from said first station to a second station, (D) at said second station
  (i) rotating a cylindrical foam body about its longitudinal axis by rotating a supporting rod located therein,
  (ii) bringing a downwardly moving cutting element from a first position into contact with the rotating foam body to thereby produce a continuous sheet of foam material,
  (iii) winding said continuous sheet upon a mandrel,
  (iv) stopping the downward movement of said cutting element once the cutting element has progressed a predetermined distance through said rotating foam body to thereby cause said cutting element to cut the continuous sheet across its width,
  (v) discharging the fully wound roll from said second station,
  (vi) discharging the remainder of said foam body from said second station, and
  (vii) returning the cutting element to its original position; and (E) transporting said remainder of said foam body to a third station, (F) at said third station, removing the remainder of the foam body from the supporting rod, and (G) transporting said supporting rod from said third station to said first station, wherein
  (i) the transporting step (A) does not occur until completion of the operation of step (B) and occurs substantially simultaneously with the transporting step (C),
  (ii) the transporting step (C) does not occur until completion of the operation of step (D), and
  (iii) the transporting step (E) does not occur until completion of the operation of step (D) (i) through (vi).

In the most preferred embodiment, the cylindrical foam body transported in step (A) already has an axial bore therethrough, and is produced according to the inventions described in U.S. Pat. Nos. 4,243,617 and 4,243,625. Furthermore, in the most preferred embodiment; prior to the first transportation step, the cylindrical foam body which may have an axial bore therethrough is transported to a pre-station where the foam body is oriented horizontally. In an additional preferred embodiment, the cutting element moves downwardly through the rotating foam body at a rate such that a continuous sheet of uniform thickness is produced. Finally, in the most preferred embodiment, a plurality of first, second and third stations are provided so that a plurality of wound rolls are substantially simultaneously produced.

One apparatus for performing the process of the present invention comprises:

(A) a first transporting means for delivering a cylindrical foam body to a first station, (B) said first station comprising means for inserting a supporting rod through the longitudinal axis of a cylindrical foam body, (C) a second transporting means for delivering a cylindrical foam body having a supporting rod through the longitudinal axis thereof from said first station to a second station, (D) said second station comprising
  (i) means for engaging a supporting rod located through the axis of a cylindrical foam body,
  (ii) means for rotating said engaging means,
  (iii) a movable cutting means,
  (iv) means for moving said cutting means up and down and for bringing said cutting means into contact with a foam body being rotated,
  (v) winding means for winding a continuous sheet of foam during operation of said cutting means,
  (vi) a first discharging means for discharging a fully wound roll of foam from said second station, and
  (vii) a second discharging means for discharging a cylindrical foam body from said second station, (E) a third transporting means for delivering a cylindrical foam body from said second station to a third station, (F) said third station comprising means for removing foam from a supporting rod, (G) a fourth transporting means for delivering a supporting rod from said third station to said first station; wherein
  (i) the first transporting means (A) is not activatable until either station B is empty or until completion of the operation of said inserting means (B) and is activatable substantially simultaneously with activation of said second transporting means (C), and
  (ii) the transporting means (C) is not activatable until the movable cutting means is returned to its original position.

In the most preferred embodiment, the cylindrical foam bodies transported via transporting means (A) already have an axial bore therethrough, said bore adopted to receive a supporting rod. Prior to said first transporting means (A), it is also generally preferred to transport a foam body to a pre-station which comprises means to orient a foam body horizontally. In one particularly preferred embodiment, the transporting means (C) also comprises means for removing a foam body from said first station and means for orienting the foam body for proper alignment with the engaging means (D) (i).

DETAILED DESCRIPTION OF THE INVENTION

Reference will now be made to the drawings for a detailed description of the process and apparatus. It should be noted that the drawings are for illustration purposes and are not necessarily drawn to scale. It should also be noted that the description assumes the use of the pre-station noted above, although such pre-station is not essential.

FIG. 1 represents a schematic drawing showing the instant invention, in the overall layout of a production facility for the manufacture of a wound roll of foam and particularly rebonded polyurethane foam. A cylindrical foam body, preferably having an axial bore therethrough, is transported via 1 to a pre-station 2. At the pre-station, the foam body is oriented such that the longitudinal axis is in a horizontal plane relative to the plane of the floor of the facility. The foam body is then transported in the horizontal orientation via transporting means 3 to a first station 4. At the first station, a supporting rod is inserted through the axial bore. The foam body containing the supporting rod is then transported via 5 to a second station 6. At the second station, a plurality of operations are performed on the cylindrical foam body. First, the cylindrical body is delivered to the second station in a manner such that the supporting rod can be engaged by rotatable driving means. Once the supporting rods are engaged, the foam body is rotated. A movable cutting element is then lowered to contact the rotating foam body. In general, the first few (generally 2 or 3) revolutions are scrap since the cylindrical body must be trued before good material is reached and to ensure that the cylindrical body is indeed cylindrical. Once the cylindrical body is trued, the downward motion of the cutting element is generally stopped causing the cutting element to cut off the scrap portion. The cutting element then, once again, begins its downward movement to thereby produce a continuous sheet of foam material.

Although the operation of the cutting element will be described in detail hereinafter, it should be noted that the cutting element can operate in essentially two manners. In the first mode of operation, the cutting element provides a so-called "dive-cut". In the dive-cut method, the cutting element moves downward through the foam body at a rate of travel equal to the desired thickness of the cut per a predetermined peripheral distance of the cylindrical foam body. This rate of travel occurs once per revolution. In the second mode of operation, the cutting element provides a so-called "spiral-cut". In the spiral-cut method, the cutting element moves downwardly through the log at a rate of travel equal to the desired thickness of the cut per one revolution of the cylindrical body.

Regardless of which cutting method is used, the continuous sheet formed is wound upon a mandrel. Once the cutting element has passed through the rotating foam body to a predetermined distance (generally from ½ to 1" from the supporting rod), the downward movement of the cutting element is stopped and/or reversed causing the cutting element to cut off the continuous sheet. A resultant fully-wound foam roll is discharged via 7 to roll storage and the supporting rod having the remainder of the unpeeled foam therein is discharged via 8 to a third station 9.

At the third station, the remainder of the foam is stripped off the supporting rod and conveyed via 10 to a foam scrap storage area. The scrap from this station and the scrap from the second station can, of course, be recycled to produce rebonded foam using, for example, the inventions described in U.S. Pat. Nos. 4,243,617 and 4,243,625.

Once the scrap foam has been stripped from the supporting rod, the supporting rod is then returned via 11 to the first station 4.

The transporting means 3 does not begin its transporting function until either no cylindrical body is at the first station or a supporting rod has been inserted into the foam body at the first station 4 and begins its transporting function substantially simultaneously with the beginning of the transporting function of transporting means 5. Similarly, the transporting means 5 is not activated until completion of the various operations which take place at the second station 6, while the transporting means 8 is not activated until completion of all the operations at the second station except that this means 8 need not await return of the cutting element to its original position. The transporting means 11 can run substantially continuously with the consequence that a plurality of supporting rods arrive at the vicinity of the first station 4 and are used at station 4 as the need arises.

Figure 2:
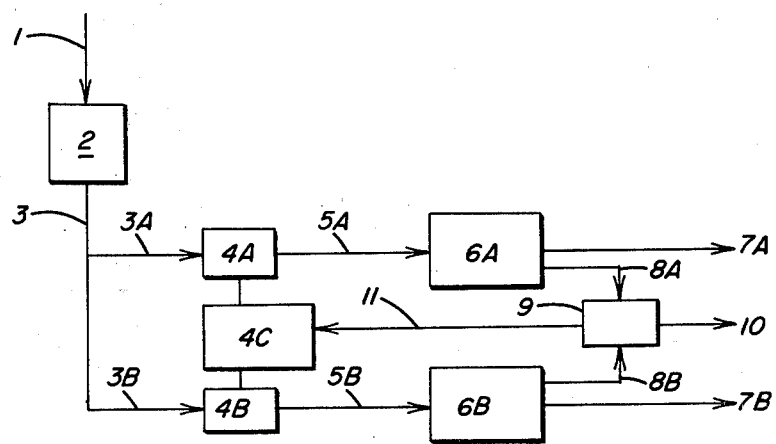

As noted earlier, in one preferred embodiment a plurality of first and second stations are provided so that production of wound rolls is even further increased. FIG. 2 represents a schematic of this particular embodiment. Thus, a cylindrical foam body, preferably having an axial bore therethrough, is transported via 1 to a pre-station 2. At the pre-station, the foam body is oriented such that the longitudinal axis is in a horizontal plane relative to the floor of the facility. The foam body is then transported via either 3 and 3A or 3 and 3B to either first station 4A or 4B respectively, depending upon which of stations 4A or 4B do not have a foam body thereat. At the first stations 4A and 4B, a supporting rod is inserted through the axial bore utilizing a rod inserting means 4C. The foam bodies containing the supporting rods are then transported via 5A and 5B to second stations 6A and 6B. In a manner identical to that described relative to FIG. 1, finished wound foam rolls are discharged via 7A and 7B, and supporting rods still having foam thereon are transported via 8A and 8B to third station 9 where the foam is removed from the supporting rod and sent to scrap via 10. The supporting rods are then transported via 11 back to the rod inserting means 11. The overall operation of this embodiment is substantially identical to that described relative to FIG. 1. In this embodiment, one of the lines (denoted by (i) 3A, 4A, 5A, 6A, 7A, and 8A and (ii) 3B, 4B, 5B, 6B, 7B, and 8B) will generally lag behind the other since as will hereafter become apparent, the rod inserting means 4C presently contemplated will only insert one supporting rod at a time.

Regardless of which embodiment is chosen (i.e., FIG. 1 or FIG 2) all of the various process and transporting steps can be controlled in any suitable manner. For example, each function could be individually controlled via suitable electrical control means. It is preferred, however, that all the various functions be programmed into a single control unit in substantially any known manner. A particularly preferred system is one commercially available from Texas Instruments known as 5TI Programmable Control System and, specifically, the system known as 5TI-1023. The particular control means selected is, of course, not critical, and in fact need not be used.

Reference will now be made to the various portions of the instant invention and will be specifically directed to: (A) an operation overview; (B) the cylindrical foam body infeed to the first station; (C) the first station, i.e., supporting rod insertion; (D) the cylindrical foam body infeed to means for delivering the foam body to the second station; (E) the cylindrical foam body infeed to the second station; (F) the second station: peeling and winding; (G) second station: supporting rod and wound roll discharging; (H) the supporting rod delivery to the third station and the third station, i.e., foam removal; (I) the supporting rod return to the first station; (J) the pre-station, i.e., cylindrical body orientation; and (K) a driving means for the cutting element.

OPERATION OVERVIEW

Figure 3:
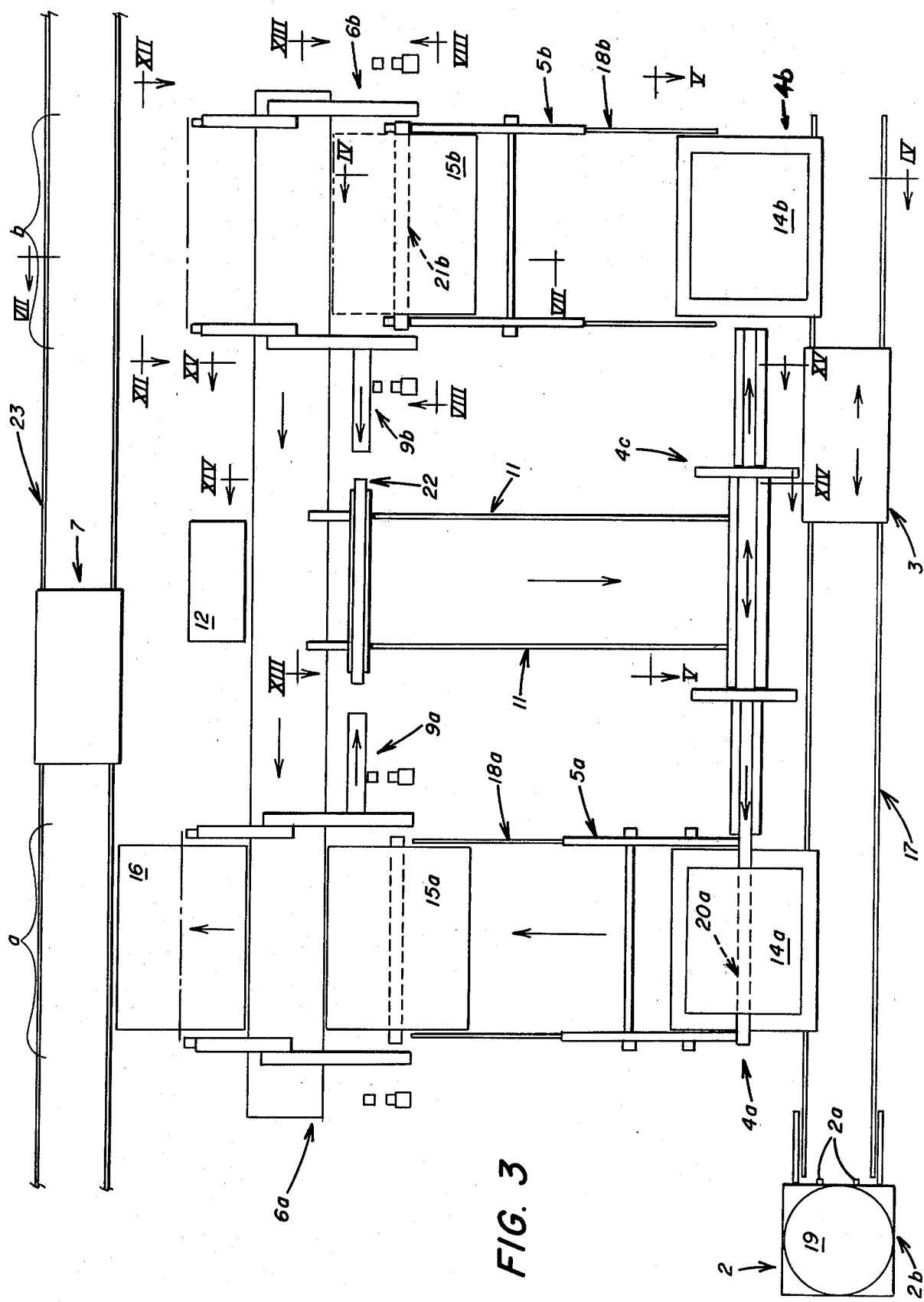
FIG. 3 is a top view of the preferred embodiment of the apparatus of the present invention.

In describing the operation overview, specific reference will be made to FIG. 3. In FIG. 3, a plurality of cylindrical foam bodies, 19, 14a, 14b, 15a and 15b, are in the process of being acted upon by the various elements of the invention. Two separate lines, a and b, are provided for carrying out the various operations. A cylindrical foam body 19 is delivered to pre-station 2, preferably using a lift truck. The cylindrical bodies generally used are about 60" in diameter and 76" long, although the actual size will, of course, depend upon the method used to make the particular cylindrical body. The foam body 19 is placed on the pre-station 2 in the vertical position. The prestation (shown in more detail in FIG. 16) is adapted to be raised at one end so that the foam body 19, when ready to be loaded upon transporting means 3 (movable on tracks 17) is tilted over and falls onto transporting means 3 such that the body 19 is in a horizontal orientation. In the figure shown, transporting means 3 has delivered a foam body 14b to first station 4b and is returning to the pre-station 2.

Foam body 14a has previously been delivered to first station 4a where a supporting rod 20a is inserted through the axis. Transporting means 5a has returned from second station 6a via tracks 18a and is shown in a position prior to removing foam body 14a from first station 4a.

Transporting means 5b, movable on tracks 18b is shown in position delivering a foam body 15b, having a supporting rod 21b therethrough, to the second station 6b. Foam body 15a, having a supporting rod 21a therethrough, is at station 6a and is shown in the process of being peeled to form a roll of a continuous sheet of foam, 16.

Supporting rods are discharged from station 6a and 6b to third stations 9a and 9b respectively, with foam being removed from the supporting rods and with the foam dropping on conveyor 10. From conveyor 10, the scrap is placed in scrap storage or is recycled to suitable rebonding equipment. Supporting rod 22 is shown in position for returning via chain belts 11 to the first station 4c for supporting rod insertion.

Once a roll is completed, it is discharged from the second station (6a or 6b) onto a transporting means 7 mounted on tracks 23 which conveys the roll to roll storage. An operator can be positioned at a central console, 12, through which all the operations may be coordinated. The speed with which a single cylindrical foam body moves through all the various operations is directly dependent upon the cutting or peeling speed. In general, cutting speeds can range up to as high as about 140 feet per minute, but more normally are around 125 feet of foam sheet per minute. Typically, for the cylindrical bodies currently used, the operation of the second station takes about 5 minutes.

CYLINDRICAL FOAM BODY INFEED TO FIRST STATION

Figure 4:
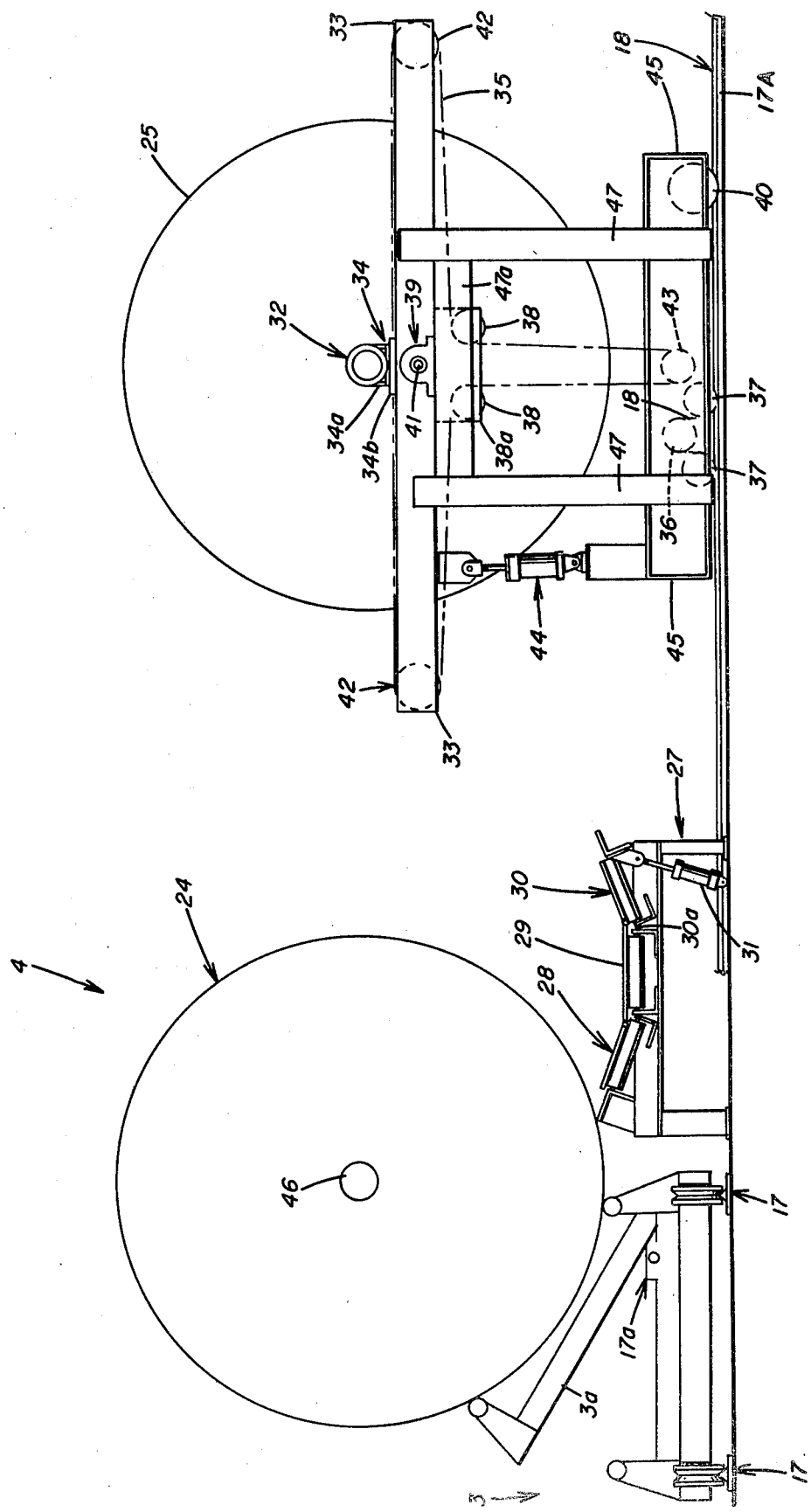
FIG. 4 is a view of FIG. 3 along line IV—IV showing a first cylindrical foam body being placed in position for insertion of a supporting rod therethrough and a second cylindrical foam body being delivered to the peeling station.

Reference will now be made to FIG. 4 for a detailed description of the means for transporting foam bodies to the first station. FIG. 4, while a view of FIG. 3 along line IV—IV, shows a first cylindrical body 24 being delivered to the first station 4, and a second cylindrical body 25 awaiting delivery to the second station.

Chain-driven transporting means 3, movable on tracks 17 is provided with an air cylinder 17a which raises a center element 3a, causing the cylindrical body 24 to roll into the first station 4. The first station has a loading platform 27 fixed to the floor of the facility. Rigid plates 28 and 29 extend the full width of the loading platform and are fixed in the position shown while rigid plate 30 (also extending the full width of the loading platform) is rotatable about hinge point 30a. Hydraulic cylinder 31 is fixed to the floor and is adapted to raise or lower the free end of plate 30. The plate 30 is raised to allow the foam body 24 (shown provided with an axial bore 46) to roll into the loading platform. Once the foam body has been loaded onto the loading platform, the first station may be activated for insertion of a supporting rod.

As noted above, FIG. 4 also shows a second cylindrical body 25, with supporting rod 32 therethrough, awaiting delivery to the second station, 6. The device shown in FIG. 4 (whose operation will be later described) generally consists of a rigid lower frame 45 movable along track 17A using suitable mounted wheels 40 (only one has been shown for clarity purposes, but the frame will have four such wheels). The frame is driven along track 17A via suitably mounted hydraulic motor 36, such as a CHAR-LYNN ORBIT motor which travels on static chain 18, which chain is fixed (not shown) at both ends. The chain 18 is passed over two suitably fixed sprockets 37, one of which is an idle sprocket and the other being a chain tightening sprocket which is preferably adjustable. The hydraulic motor 36 and the two sprockets 37 are physically located inside the rectangular shell formed by frame 45. Four columns 47 (two shown and two on the other side) are attached to the outside of frame 45, with a cross beam 47a attached to each set of columns 40. Fixtures 39 are rigidly connected to each cross beam, each fixture 39 being provided with its own pivoting rod 41 which will allow the two upper frame portions 33 (one shown and one behind it) to pivot about rods 41. The upper frame portions generally each consist of two plates rigidly fixed to each other and spaced from each other. At each end of the sets of plates are suitably fixed sprockets 42. Rigidly fixed to the underside of each set of plates is a mounting plate 38a upon which are mounted two additional sprockets 38, one of which is an idle sprocket and one of which is a, preferably adjustable, chain tightening sprocket. Attached to the lower frame are the driving sprockets 43, one for each set of sprockets 38 and 42. The driving sprockets 43 are driven via a single driving motor (i.e., one motor drives both driving sprockets), preferably a hydraulic motor, such as a CHAR-LYNN ORBIT motor. The chains 35 pass over the sprockets 42, sprockets 38 and driving sprockets 43 and cause the movement of supporting rod engaging means or gripper 34 back and forth along the upper frame 33. The rod gripper preferably consists of two angle irons 34a and rigidly fixed to plate 34b which in turn are rigidly connected to chains 35. One end of each upper frame portion 33 is provided with a hydraulic cylinder 44 rigidly fixed to the lower frame, which acts to raise or lower that end.

THE FIRST STATION: SUPPORTING ROD INSERTING

Figure 5:
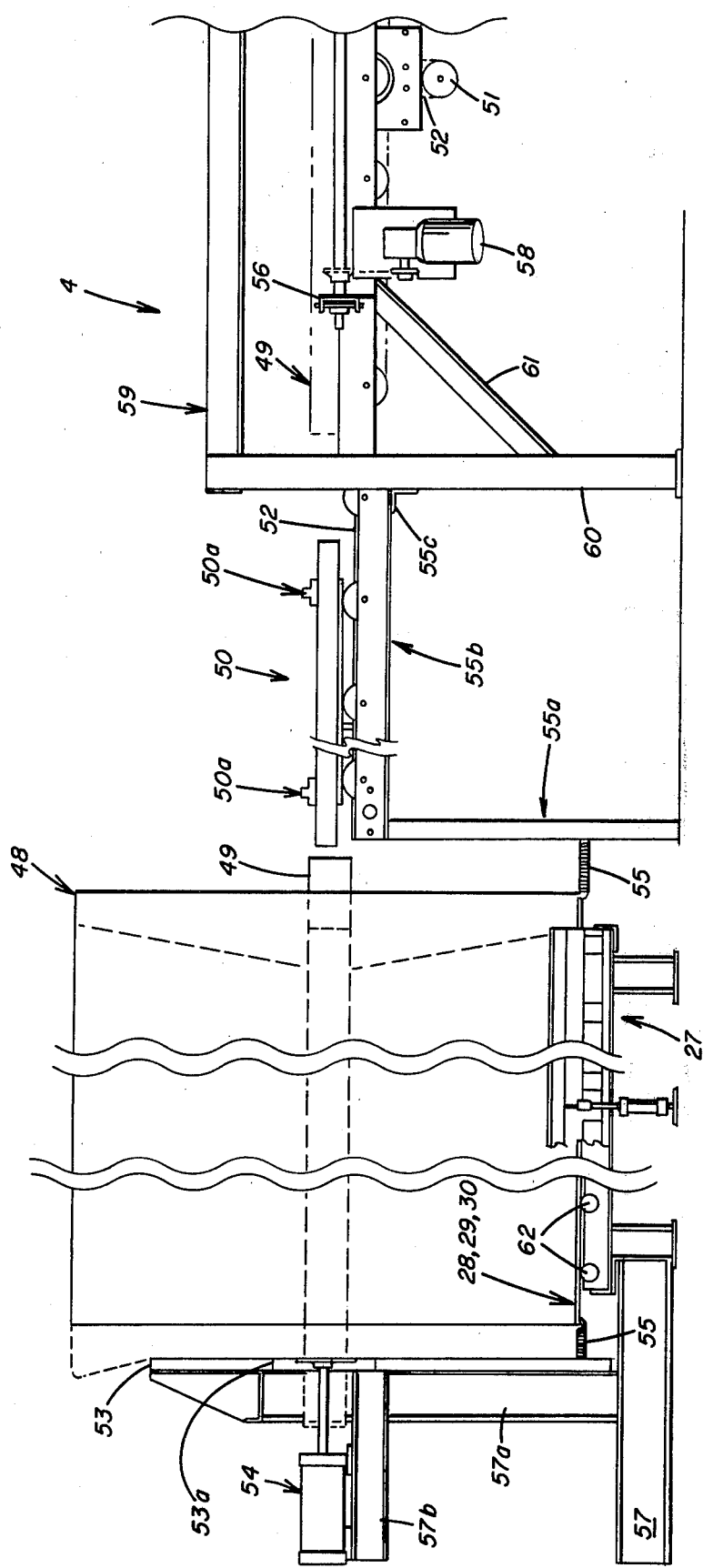
FIG. 5 is a view of FIG. 3 along line V—V showing a supporting rod being inserted into a cylindrical foam body.

Reference will now be made to FIGS. 5, 14 and 15 for a detailed description of the first station—the station where a supporting rod is inserted into a cylindrical foam body.

Once a cylindrical foam body 48 is loaded on plateform 27, a supporting rod 49 (preferably an iron pipe) is delivered to the first station 4 via supporting rod return chain 56 powered by electric gearmotor 58 such as a Reliance A.C. motor in combination with a HUB CITY gearbox and rests on feed chain 52. The supporting rod pusher 50, rigidly fixed to a driven feed chain 52, at this stage, is off the right side of FIG. 5. A hydraulic motor 51, such as a CHAR-LYNN ORBIT motor, drives the feed chain 52, causing supporting rod pushing means (or pusher) 50 to travel (in the case of FIG. 5) from right to left and causing the fixture 50a rigidly attached to pusher 50 to push against the outside edge of supporting rod 49. As supporting rod 49 is pushed into cylindrical foam body 48, the platform 27 allows the foam body 48 to be pushed against supporting rod restraining means or backstop 53. The backstop 53 is generally made of a rigid material such as steel and is, preferably, in the form of a plate which is anchored to the floor of the facility via frames 57 and 57a. A hole 53a is provided in backstop 53 in order to allow a substantially equal amount of supporting rod 49 to protrude from both ends of the foam body 48. The supporting rod pusher 50 then reverses its direction and returns to the center of station 4. Pneumatic cylinder 54, mounted on crossbeam 57b which in turn is rigidly mounted to frame 57a, then pushes back against supporting rod 49 thereby pushing supporting rod 49 and foam body 48 into proper position to be picked up for delivery to the second station, and to push supporting rod 49 to clear backstop 53. The overpushing (shown in dotted lines) of the supporting rod 49 into the foam body 48 is done in order to compensate for the compression and deformation (shown in dotted lines) of the foam body 48 as the foam body receives the supporting rod. Springs 55, rigidly attached to frame 57a and to frame 60 (via supporting column 55a, crossbeam 55b and angle iron 55c), and rigidly attached to rigid plates 28, 29 and 30 (see FIG. 4) reposition and center loading platform 27. In the embodiment shown, the rigid plates 28, 29 and 30 are allowed to move over rollers 62, thereby allowing the foam body 48 to be pushed against backstop 53 and to return the foam body with its supporting rod to the center position.

The supporting rod pusher 50 will remain in the center of station 4 until it is determined which side of the apparatus requires a supporting rod. If the right side requires a supporting rod, the supporting rod pusher 50 moves to the position shown until a supporting rod arrives at station 4. At that time, the supporting rod pusher moves from left to right to insert the required supporting rod.

CYLINDRICAL FOAM BODY INFEED TO MEANS FOR DELIVERING FOAM BODY TO SECOND STATION

Figure 6:
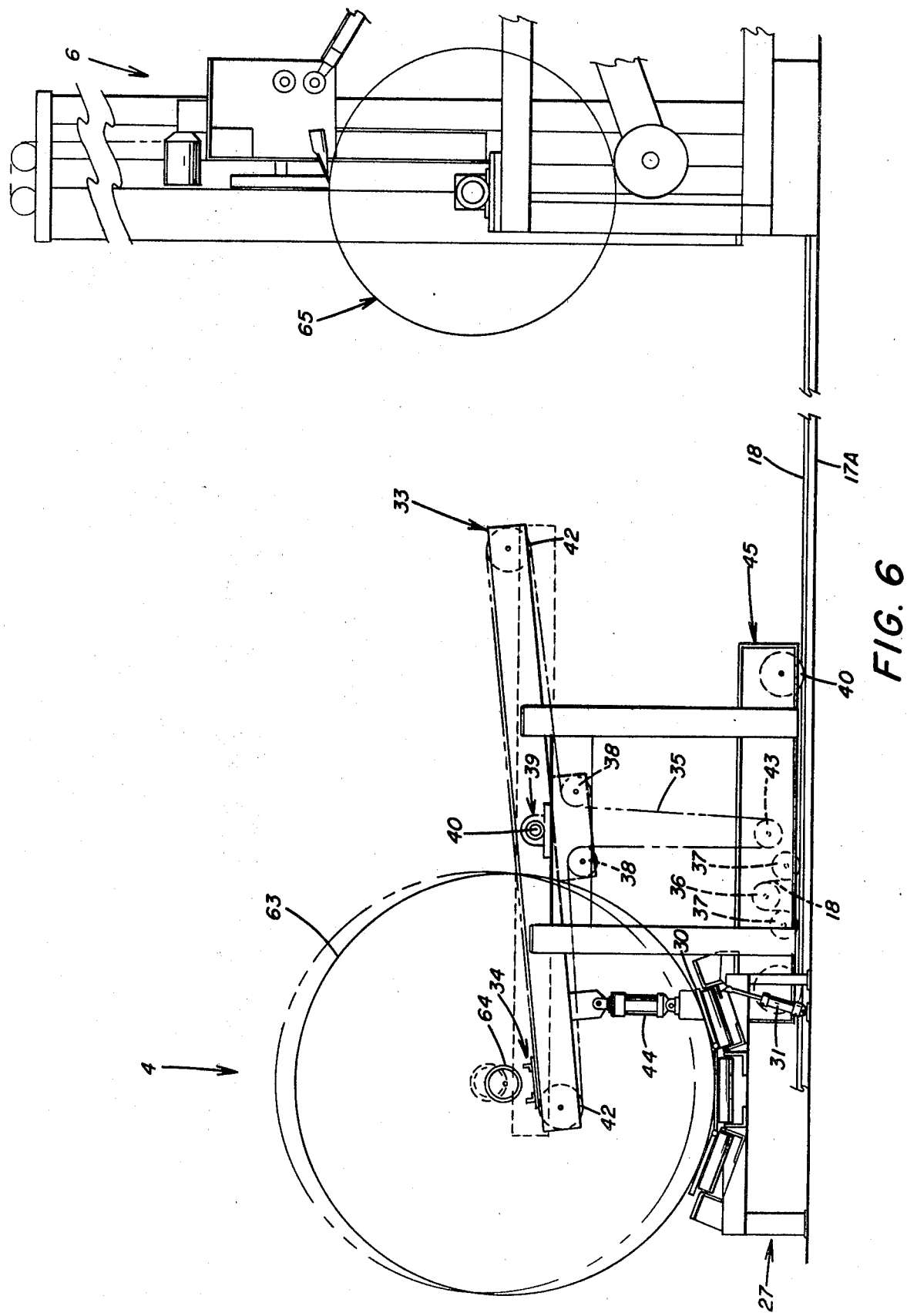
FIG. 6 is a view of FIG. 3, along line IV—IV showing a first cylindrical foam body being placed on a transporting means for delivering the foam body to the peeling station, and a second cylindrical foam body being peeled.

Reference will be made to FIG. 6 for this operation. As shown in FIG. 6, cylindrical body 65 is already at station 6 while foam body 63 with supporting rod 64 therethrough is about to be picked up by a transporting means for delivery to the second station 6.

Foam body 63, as shown, rests on loading platform 27. The rigid lower frame 45 has moved along tracks 17A on mounted wheels 40 to the position shown. As noted earlier, the frame is driven via hydraulic motor 36 which travels on static chain 18. The chain 18 passes over two sprockets 37 (one, an idle sprocket and one, a chain tightening sprocket). As the frame moves to the position shown in FIG. 6, supporting rod grippers 34 are moved to a position such that they can engage supporting rod 64. As noted earlier, the supporting rod grippers 34 are rigidly connected to chains 35 which are driven via driving sprockets 43. As supporting rod grippers 34 move to the desired position, hydraulic cylinders 44 are activated to lower upper frames 33 (frames 33 pivoting on pivot rods 40). Once the frame 33 and the supporting rods 34 are in the position shown by solid lines in FIG. 6, the hydraulic cylinders 44 are once again activated to lift the end of frame 33 such that the supporting rod grippers 34 engage each end of the supporting rod 64. This lifting is shown by the dotted lines in FIG. 6.

As the frame 33 lifts the cylindrical foam body 63 off of the supporting platform 27, air cylinder 31 is activated to lower rigid plate 30 to ensure that the foam body will clear the loading platform 27.

The lower frame 45 then begins movement towards second station 6. If a cylindrical body is already at the second station, the frame 45 is stopped at a position between the first and second stations to allow completion of the operation of the second station and to allow introduction of another cylindrical foam body to the first station. It is generally preferable that the supporting rod grippers 34 are made to travel from the first station towards the second station via chains 35 at the same time the lower frame 45 is advanced towards the second station.

CYLINDRICAL FOAM BODY INFEED TO THE SECOND STATION

Figure 7:
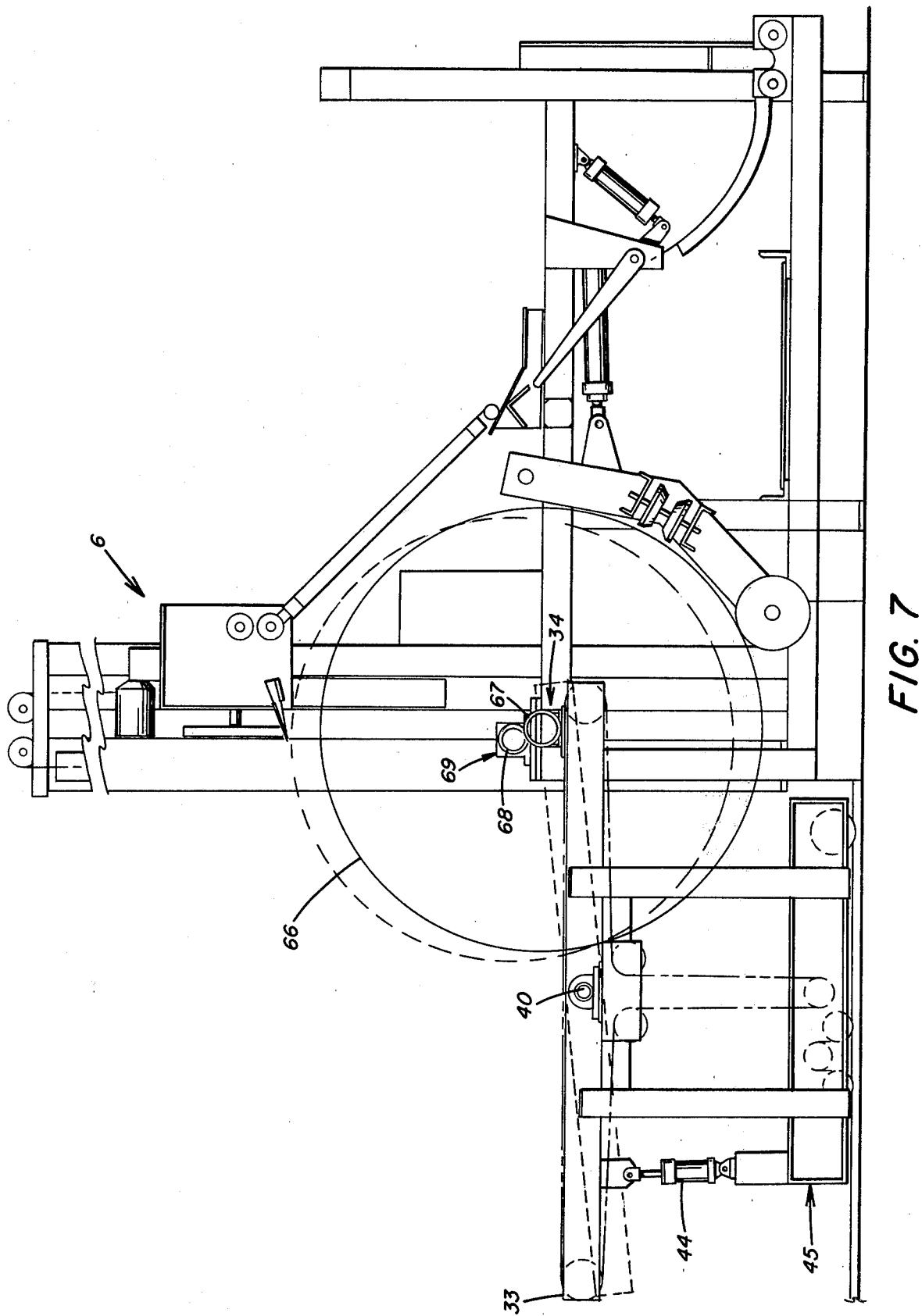
FIG. 7 is a view of FIG. 3 along line VII—VII showing a cylindrical foam body being delivered to the peeling station.
Figure 8:
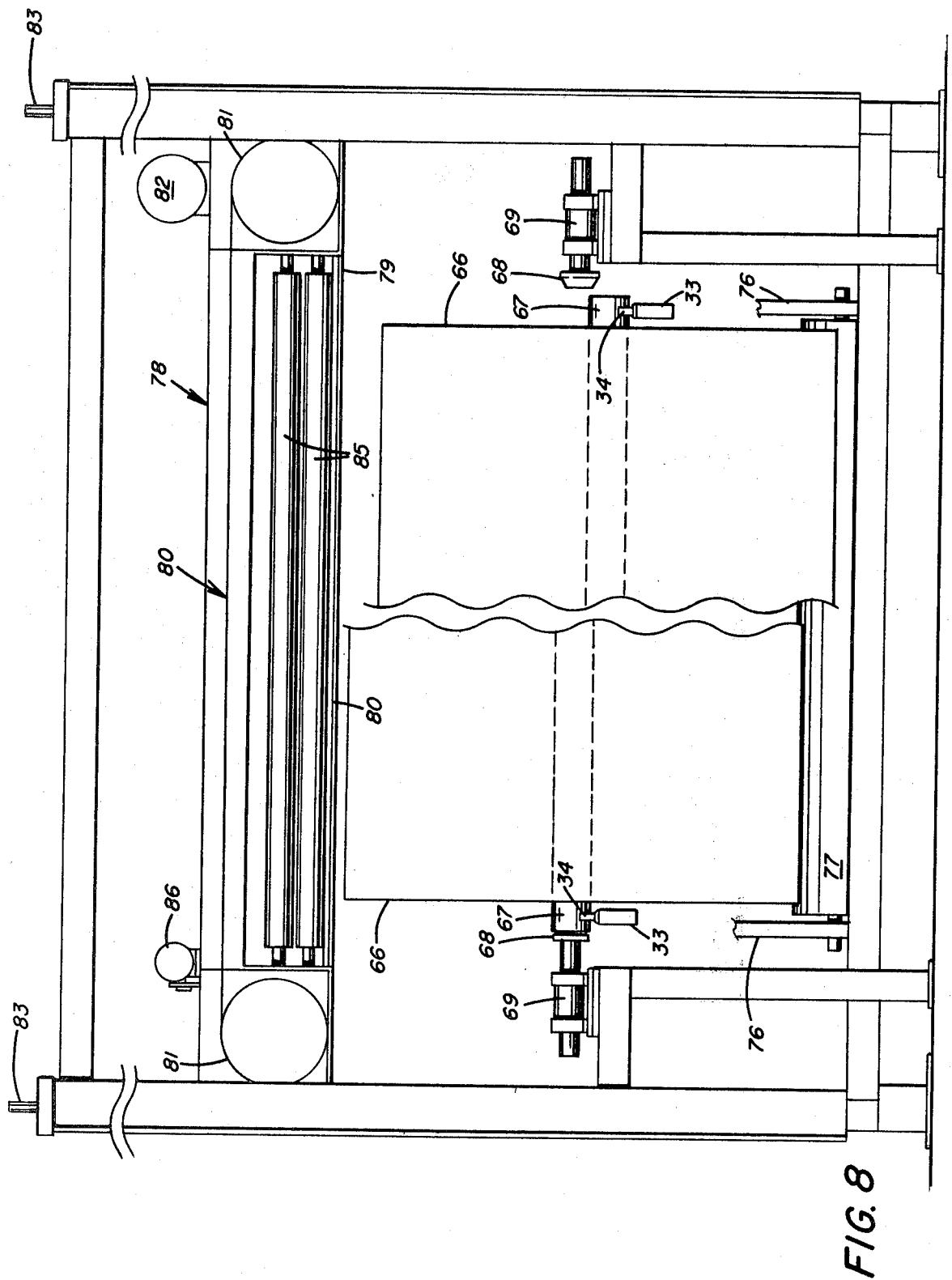
FIG. 8 is a view of FIG. 3 along line VIII—VIII showing, at the left side, a cylindrical foam body in position for peeling and, at the right side, a cylindrical foam body immediately prior to being placed in the peeling position.

Reference will now be made to FIGS. 7 and 8. For simplicity purposes, several elements described earlier have not been numbered in this figure.

As shown in FIG. 7, lower frame 45 has now moved to the loading position of the second station 6. Supporting rod grippers 34 move the cylindrical body 66 horizontally into a position such that the supporting rod 67 can be lined up with rotatable centers 68. Hydraulic cylinders 44 retract and upper frame 33 lifts supporting rod 67 vertically into position for insertion of the rotatable centers 68 (note the dotted portion of FIG. 7). Pneumatic cylinders 69 extend, pushing the rotatable centers 68 into the open ends of the supporting rod 67. This particular operation can best be seen by referring to FIG. 8 wherein the right hand position shows the foam body 66 about to be lifted into position, and wherein the left hand position shows the rotatable center 68 engaging one open end of supporting rod 67.

Once the supporting rod 67 has been engaged by the rotatable centers 68, hydraulic cylinders 44 extend thereby lowering the upper frame 33. The lower frame 45 is then backed away from the second station and returns to pick up another cylindrical body.

THE SECOND STATION: PEELING AND WINDING

In describing the peeling operation, reference will be made to FIGS. 8, 9, 10, 11, 12, 12A, 12B and 13.

At the second station 6, cylindrical foam body 66 is readied for peeling. Hydraulic cylinders 75 (see FIG. 9) extend, thereby pushing drive roller arms 76 up to lift drive roller 77 against cylindrical foam body 66. Drive roller 77 rotates and is powered by an electric gearmotor 77A (see FIG. 13), such as any convention D.C. motor in combination with a HUB-CITY gearbox. The cylindrical body 66 turns clockwise with hydraulic cylinder 75 maintaining constant pressure between the drive roller 77 and the cylindrical body 66.

A suitably mounted cutting element guide bridge 78 begins moving downwardly, lowering the cutting element guide 79 into cylindrical body 66. Cutting element 80 rotates around cutting element pulleys 81 through cutting element guide 79. The cutting element 80 is powered by a cutting element motor 82 (see particularly FIG. 13), such as an A.C. Reliance electric motor. The cutting element guide bridge 78 is supported by counterweight chains 83 and is powered up and down by a suitable drive assembly of the type generally known and used in the art and described in more detail hereafter. Cutting element 80 is driven down into cylindrical body 66 in either the dive-cut mode of operation or the spiral-cut mode of operation. The first 2 or 3 revolutions are scrap since the cylindrical body must be trued and before good material is reached. Scrap material 84 cut from cylindrical body 66 passes over the top of cutting element guide 79, through nip rollers 85 powered by electric gear motor 86 (see particularly FIG. 13 for detail of gear motor 86), such as any conventional D.C. motor in combination with a HUB-CITY gearbox, down ramp 87, through the open scrap gate 88 and onto a scrap conveyor 89. The scrap can, of course, be recycled to produce rebounded foam.

Once the cylindrical body 66 has been trued, cutting element guide bridge 78 stops its downward movement thereby causing cutting element 80 to cut off scrap material 84 from the rotating cylindrical foam body 66. Once all of the scrap material has passed through the open scrap gate 88, scrap 88 is closed by retracting pneumatic cylinder 90.

Cutting element guide bridge 78 then again begins it travel downward and cutting elements 80 begins cutting good material 91 in the form of a continuous sheet of foam from cylindrical body 66. The desired sheet 91 from cylindrical body 66 passes over the top of cutting element guide 79, through nip rollers 85, down ramp 87, across closed scrap gate 88, down discharging ramp 92, across wind-up rollers 93 and wound-up around wind-up mandrel 95, thereby forming a wound roll of foam 96. The wind-up rollers 93 are driven by a gearmotor 94 (see FIG. 12B), such as any conventional D.C. motor in combination with a HUB-CITY gearbox.

As the leading edge of the foam sheet 91 passes under the wind-up mandrel 95, it is presently necessary for the leading edge to be manually turned over the mandrel 95 in order to actually allow the winding to begin.

As shown in FIGS. 12, 12A and 12B, wind-up mandrel 95 is confined by locking angles 97 which allow the wind-up mandrel 95 to freely rise as the wound roll 96 increases in size. The locking angles 97 hold the wind-up mandrel 95 via pneumatic cylinders 98. The locking position is best illustrated by the left portion of FIG. 12A while the unlock position is shown on the right portion of FIG. 12A.

While the drawings set forth show rigid framing suitable for mounting the various elements of station 6, such framing has not been numbered since such numbering would tend to clutter each drawing and since the mode of mounting would be readily apparent from the drawings to the routineer in the art.

Figure 9:
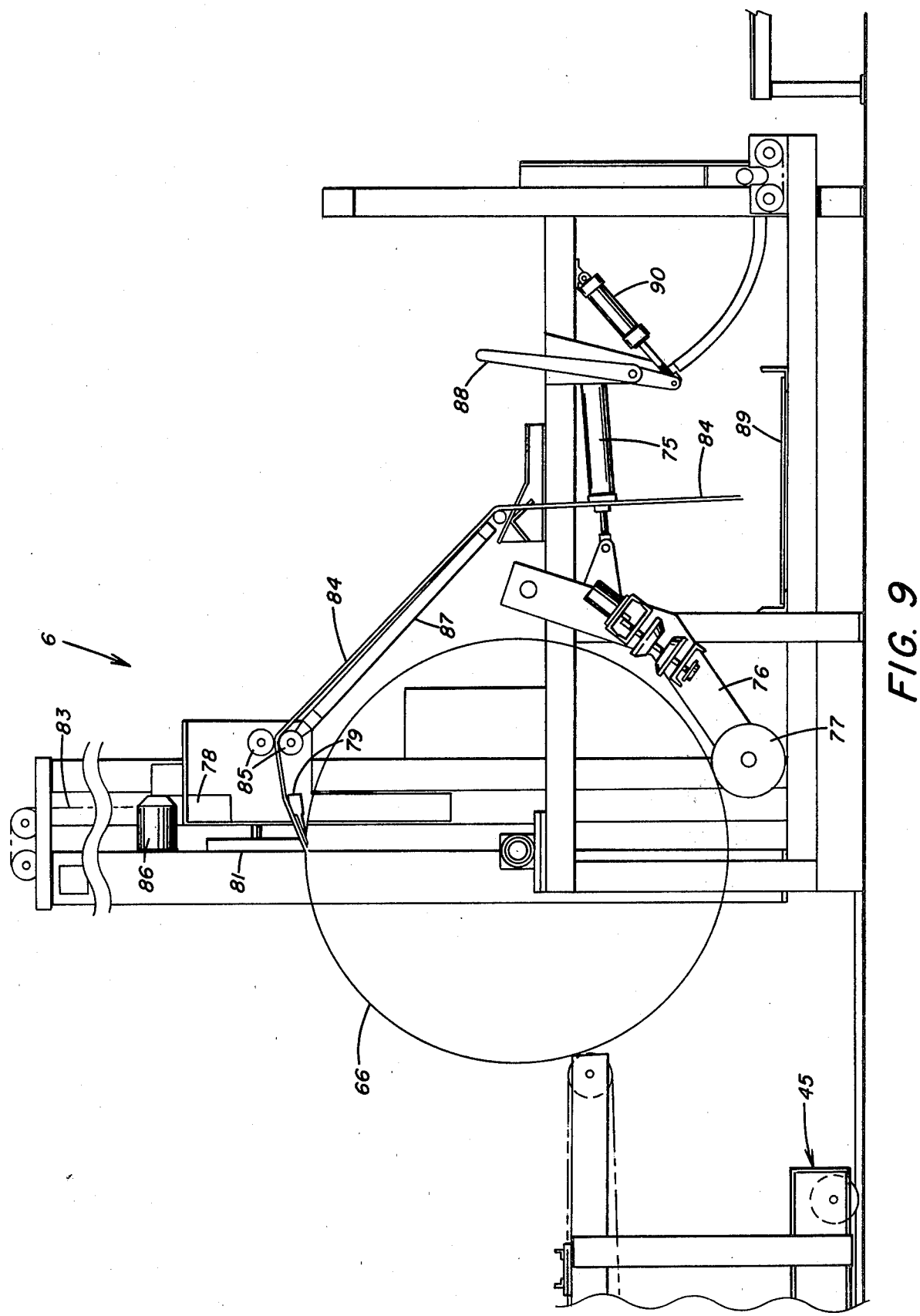
FIG. 9 is a view of FIG. 3, along line VII—VII, showing the beginning of the peeling operation.
Figure 10:
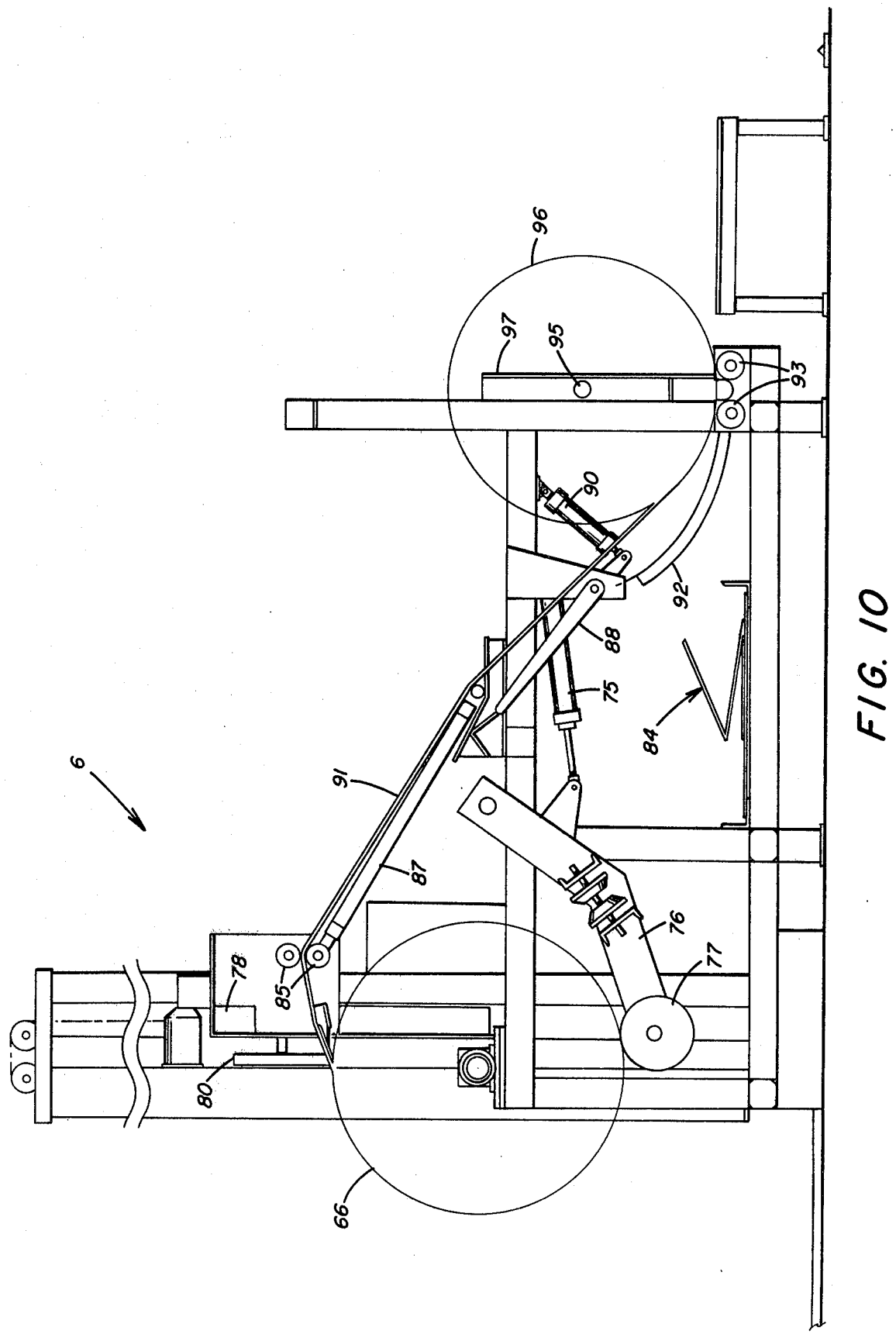
FIG. 10 is a view of FIG. 3, along line VII—VII, showing the peeling operation and the simultaneous production of a continuous sheet of foam in roll or wound form.
Figure 11:
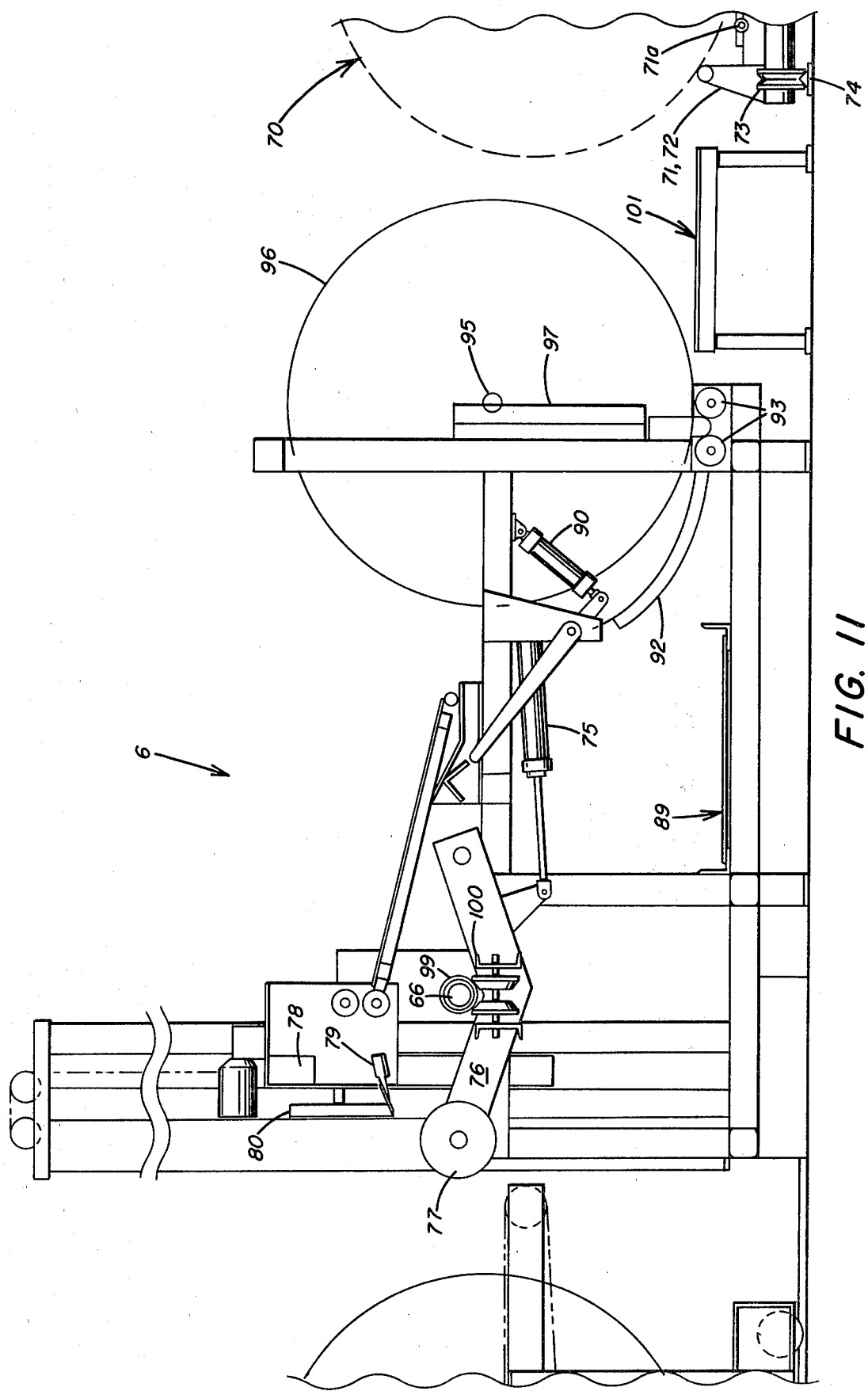
FIG. 11 is a view of FIG. 3 along line VII—VII showing the completion of the peeling operation and a cylindrical foam body awaiting introduction into the peeler.

One particular advantage of the present invention is illustrated in the left hand portions of FIGS. 9 and 11. As shown in FIG. 9, once a cylindrical body 66 has been positioned in the second station 6, the lower frame 45 is returned to the first station to pick up another cylindrical foam body for delivery to the second station 6 upon completion of the operation of the second station. FIG. 11 shows the frame 45 with a cylindrical foam body awaiting delivery to the second station. A new cylindrical foam body is not delivered to the second station 6 until the cutting element guide bridge 78 returns to its original position to begin another peeling cycle.

SECOND STATION: SUPPORTING ROD AND WOUND ROLL DISCHARGE

Reference will now be made to FIGS. 11, 12, 12A, 12B and 13.

During the cutting or peeling operation, once cutting element 80 cuts through a predetermined distance of cylindrical foam body 66 (generally within about ¾" of the supporting rod 67), the downward travel of cutting element guide bridge 78 is reversed which causes the cutting element 80 to cut off good material 91, terminating the cutting or peeling operation and leaving a small amount (generally about ¾") of foam material 99 on the supporting rod 67. After all of the good material has been wound into roll 96, the locking angles 97 are opened by pneumatic cylinders 98 thereby releasing wind-up mandrel 95. In the presently preferred embodiment, discharge ramp 92 is provided with a hole (not shown) through which an air cylinder activated pushing element may pass to thereby push the wound roll 96 across table 100 and onto transfer cart 71. FIG. 11 also shows a wound body of foam 70 resting on transporting cart 71. The foam body can be lifted off cart 71 via an air cylinder 71a which raises a center element 72 to cause the wound foam to roll off of the cart 71 to wound foam storage. The cart 71, like the transporting means 3, is mounted on rollers 73 and is movable on tracks 74.

The wind-up mandrel 95 is slipped out of the center of the wound roll and returned to the second station. This removal and return is currently performed manually. Pneumatic cylinders 69 retract, thereby withdrawing the rotatable centers 68 from the open ends of supporting rod 67. At the same time, hydraulic cylinders 75 extend, thereby pushing drive roller arms 76 up. As the drive roller arms 76 push up, drive roller 77 is lifted against supporting rod 67 which causes the supporting rod 67 to roll back onto drive roller arms 76 and into a supporting rod discharge conveyor 100.

SECOND STATION: SUPPORTING ROD DISCHARGE and

THIRD STATION: FOAM REMOVAL

Reference will now be made to FIGS. 13, 14 and 15.

FIG. 13 shows supporting rods 67, 67A and 67B with rod 67 having scrap 99 thereon and with mandrel 67A having scrap 99A thereon. Rod 67 is shown at the second station 6 while rod 67A is shown at the third station 9. In practice, a single supporting rod passes directly through both stations so that it would be unlikely that one supporting rod would be at the second station and another supporting rod at the third station. Of course, this would depend on layout of the equipment and the distance between the two stations. In any event, FIG. 13 represents an effort to show the sequential operation of the present invention.

When supporting rod 67 encased in foam scrap 99 rests on supporting rod discharge conveyor 100, hydraulic motor 102, such as a CHAR-LYNN ORBIT motor, is activated. Hydraulic motor 102 powers supporting rod discharge conveyor rollers 103 causing supporting rod 67 to be conveyed to the third station 9.

As the supporting rod 67 passes into the third station 9, the conveyor rollers 104, powered by electric gearmotor 105, such as an A.C. Reliance electric motor in combination with a HUB-CITY gearbox, propel the supporting rod 67 through station 9.

As supporting rod 67 passes through the third station, it moves under a foam removal means 106. In the presently preferred embodiment the foam removal means 106 is a rotatable wire brush driven by electric motor 107, such as an A.C. Reliance electric motor. Scrap foam (99 and 99A) is thus removed from the supporting rod and is allowed to drop via shoot 108 onto scrap conveyor 89.

Supporting rod 67A, free of any scrap foam, continues its travel on conveyor rollers 104 and onto supporting rod drop conveyor 109. The supporting rod drop conveyor is supported on air cylinders 110 and is powered by an electric gearmotor 111, such as an A.C. Reliance electric motor in combination with a HUB-CITY gearbox. The drop position is shown via the dotted lines on the right side of FIG. 13.

SUPPORTING ROD RETURN TO FIRST STATION

Reference will now be made to FIG. 14.

A supporting rod 67 stops on the center of supporting rod drop conveyor 109. Air cylinders 110 retract and lower the supporting rod 67 onto supporting rod return chain 56 powered by electric gear motor 58. In FIG. 14, supporting rod 112 is shown on the return chain 56; while supporting rod 113 has already been transported to the first station and rests on feed chain 52.

PRE-STATION

Figure 16:
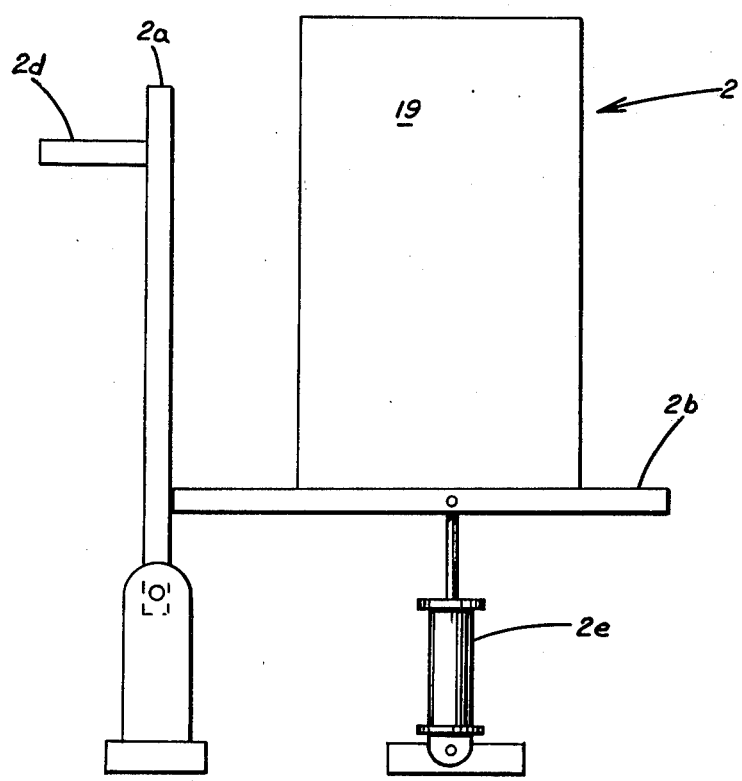
FIG. 16 is a view of a preferred pre-station.

As described herein, it is generally preferred to first orient the cylindrical foam body such that the major axis is horizontal. FIG. 16 shows a relatively simple means for orienting the cylindrical foam body. In FIG. 16, a cylindrical foam body rests in the vertical position. Once a transporting cart (as shown in FIG. 3) arrives back at the pre-station, hydraulic cylinder 2e is activated causing platform 2b to assume a more or less vertical position. Rigidly fixed to plateform 2b are two columns 2a (see also FIG. 3) having a bar 2d rigidly attached thereto. Once columns 2a are in the horizontal position, bar 2d prevents column 2a from going past the horizontal position. The height of columns 2a above the ground when they are horizontally oriented is less than the side bars of the transporting cart with the result that the transporting cart then delivers a cylindrical body to the first station. The hydraulic cylinder is then retracted causing columns 2a to once again assume a substantially vertical position.

CUTTING ELEMENT DRIVE ASSEMBLY

Figure 18:
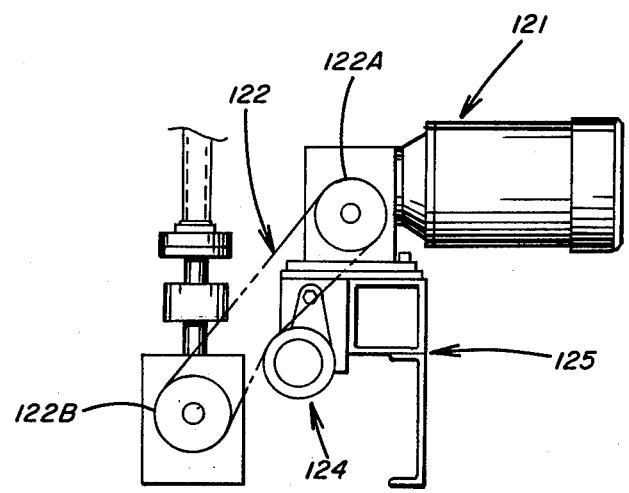
FIG. 18 is a view of FIG. 17 along line X—X.
Figure 17:
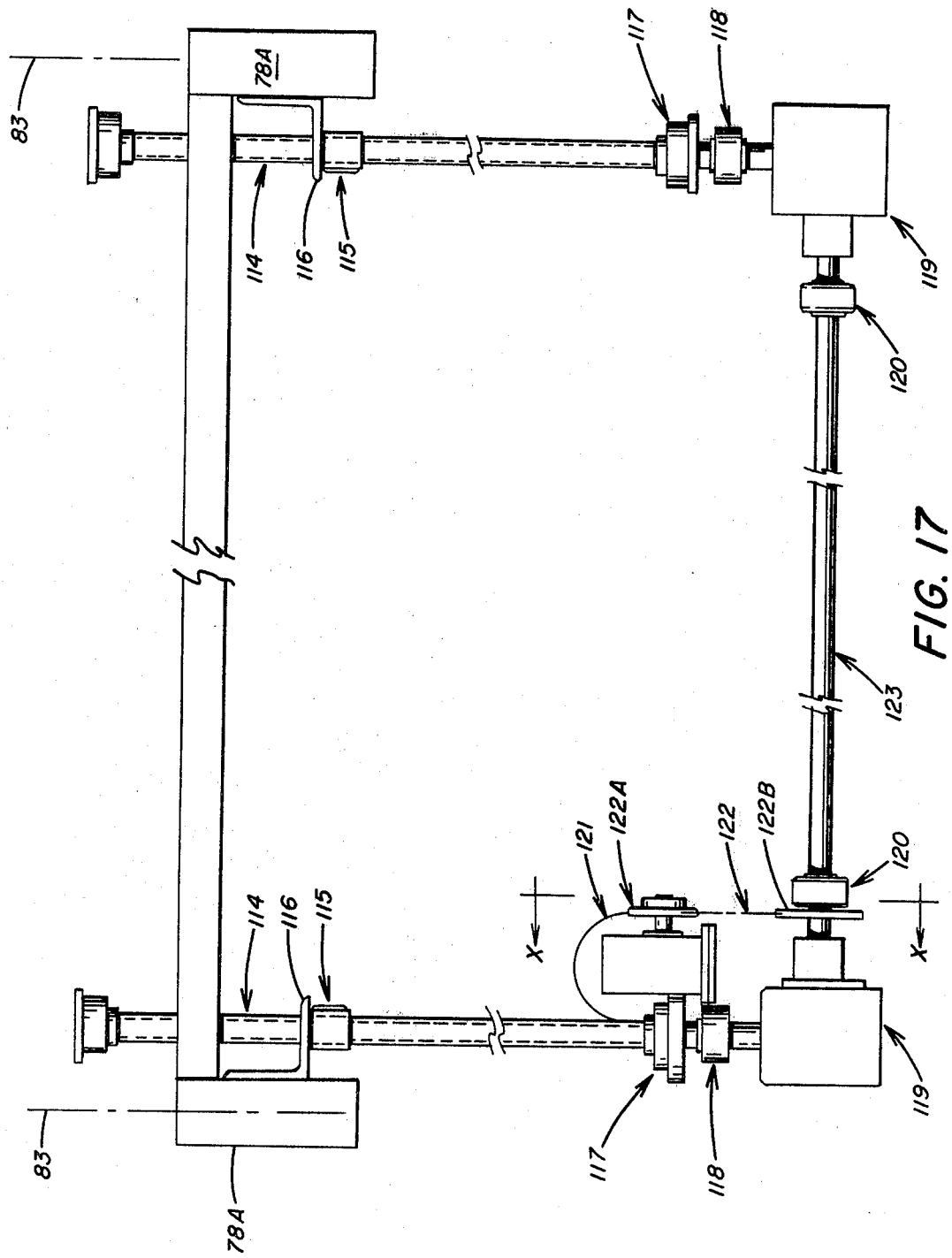
FIG. 17 is a view of a suitable drive means for moving the cutting element up and down.

Reference will now specifically be made to FIGS. 17 and 18.

As noted earlier, cutting element guide bridge 78 is movable up and down and supports the various cutting elements, i.e., the cutting element guide, the cutting element itself, the nip rollers, and the driving means associated with the nip rollers and cutting element. As previously described, the guide bridge 78 is supported by counterweight chains 83.

Cutting element guide bridge 78 is rigidly fixed to supports 78A which are in turn rigidly fixed to angle irons 116. Holding angle irons 116 in place are ball nuts 115 which will act to locate the guide bridge at any specific vertical location. Ball nuts 115 will move up and down rotating vertical screws 114 which are suitably anchored to the framing. At the lower portion of the screws 114, the screws pass through bearings 117 and bushings 118 into right angle gearboxes 119, such as a HUB-CITY MODEL 66 gearbox. A suitably supported electric motor 121, such as an INDEX-SYN MOTOR, Series 700, available from Control Systems Research, Inc., drives sprockets 122A and 122B via chain belt 122. Sprocket 122B in turn causes shaft 123 to rotate. Shaft 123 is connected to gearboxes 119 via bushings 120. In the right angle gearboxes 119, the shaft 123 causes screws 114 to rotate, thereby causing guide bridge 78 to raise or lower. As shown in FIG. 18, chain 122 passes over idler sprocket 124. Electric motor 121 is shown as being supported in frame 125. Although not shown in FIG. 17, the entire mechanism is suitably supported at the second station (in this regard, attention is directed to FIGS. 6, 7, 8, 9, 10, 11 and 13 which show suitable framing (or supporting structures) in place).

In general, in operating the drive assembly shown it is preferred that the operation of the electric motor 121 be correlated to the rotation of the rotatable center 68 in a known manner such that either a dive-cut or spiral-cut can be performed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a continuous sheet of foam material in roll form comprising:
    (A) transporting a cylindrical foam body to a first station,
    (B) at said first station, inserting a supporting rod through the longitudinal axis thereof,
    (C) transporting a cylindrical foam body from said first station to a second station,
    (D) at said second station,
        (i) rotating a cylindrical foam body about its longitudinal axis by rotating a supporting rod located therein,
        (ii) bringing a downwardly moving cutting element from a first position into contact with the rotating foam body to thereby produce a continuous sheet of foam material,
        (iii) winding said continuous sheet upon a mandrel,
        (iv) stopping the downward moving of said cutting element once the cutting element has progressed a predetermined distance through said rotating foam body,
        (v) discharging the fully wound roll from said second station,
        (vi) discharging the remainder of said foam body from said second station, and
        (vii) returning said cutting element to said first position,
    (E) transporting said remainder of said foam body to a third station,
    (F) at said third station, removing said remainder from its supporting rod, and
    (G) transporting said supporting rod from said third station to said first station, wherein
        (i) the transporting step (A) does not occur until completion of the operation of step (B) and occurs substantially simultaneously with the transporting step (C), (ii) the transporting step (C) does not occur until completion of the operation of step (D), and (iii) the transporting step (E) does not occur until completion of the operation of step (D) (i) through (vi).

2. The process of claim 1 wherein the cylindrical foam body transported in step (A) has an axial bore therethrough.

3. The process of claim 1 wherein prior to said step (A), the following two steps occur:

(H) transporting a cylindrical foam body to a pre-station; and (I) at said pre-station, orienting said foam body such that the longitudinal axis is in a horizontal plane, and wherein the transporting step (A) comprises transporting a cylindrical foam body from said prestation to said first station.

4. The process of claim 1 wherein step (D) (ii) comprises:

(a) bringing a downward moving cutting element from a first position into contact with the rotating body;

(b) stopping the downward movement after the first few revolutions of said rotating body to thereby true the rotating body; and (c) once again starting the downward movement of the cutting element to thereby produce a continuous sheet of foam material.

5. An apparatus for producing a continuous sheet of foam material in roll form comprising:

(A) a first transporting means for delivering a cylindrical foam body to a first station;

(B) said first station comprising means for inserting a supporting rod through the longitudinal axis of a cylindrical foam body;

(C) a second transporting means for delivering a cylindrical foam body having a supporting rod through the longitudinal axis thereof from said first station to a second station;

(D) said second station comprising (i) means for engaging a supporting rod located through the longitudinal axis of a cylindrical foam body, (ii) means for rotating said engaging means, (iii) a movable cutting means, (iv) means for moving said cutting means into and out of contact with a rotating foam body, (v) winding means for winding a continuous sheet of foam during the time said cutting means is in contact with a rotating foam body, (vi) a first discharging means for discharging a fully wound roll of foam from said second station, and (vii) a second discharging means for discharging a cylindrical foam body from said second station, (E) a third transporting means for delivering a cylindrical foam body from said second station to a third station, (F) said third station comprising means for removing foam from a supporting rod, (G) a fourth transporting means for delivering a supporting rod from said third station to said first station, wherein (i) said first transporting means is not activatable until either: (a) said first station does not have a cylindrical foam body thereat or (b) until a supporting rod has been inserted into a cylindrical foam body located at said first station, and is activatable substantially simultaneously with activation of said second transporting means (C), (ii) said second transporting means (C) is not activatable until completion of the operation performed at said second station.

6. The apparatus of claim 5 further comprising (H) a pre-station comprising means for orientating a cylindrical foam body such that the longitudinal axis is in a horizontal plane with said first transporting means adapted to deliver a cylindrical foam body from said pre-station to said first station.

7. The apparatus of claim 1 wherein said first station (B) comprises:

(a) a platform adapted to maintain a cylindrical foam body such that the longitudinal axis thereof is in a horizontal plane;

(b) a supporting rod restraining means located at one side of said platform, said restraining means adapted to stop the travel of a cylindrical foam body and a supporting rod once a supporting rod has been inserted through the longitudinal axis of a cylindrical foam body resting on said platform; and (c) a movable supporting rod pushing means located at the side of said platform opposite said supporting rod restraining means, said pushing means capable of pushing a supporting rod through the longitudinal axis of a cylindrical foam body resting on said platform.

8. The apparatus of claim 7, wherein said supporting rod restraining means (B) comprises:

(i) a rigid plate having a hole therein, said hole positioned such that a supporting rod being pushed through a cylindrical foam body resting on said platform will pass through said hole; and (ii) a pneumatic cylinder located behind said hole, said pneumatic cylinder capable of arresting the movement of the supporting rod which has passed through said hole and capable of pushing the supporting rod back through said hole such that the end of the supporting rod will clear said rigid plate.

9. The apparatus of claim 8, wherein the upper surface of said platform is provided with springs oriented in the same direction as the longitudinal axis of the cylindrical foam body resting thereon, said springs causing said platform to return said cylindrical foam body back to its original position after a supporting rod has been inserted therein.

10. The apparatus of claim 7 wherein said movable supporting rod pushing means is rigidly fixed to a driven chain, said chain when activated, causing said pushing means to push a supporting rod into a cylindrical foam body resting on said platform.

11. The apparatus of claim 7 wherein said second transporting means (C) comprises:

(a) means for engaging the two ends of a supporting rod protruding through a cylindrical foam body resting on said platform;

(b) means for lifting and lowering said engaging means (a); and (c) means for moving said engaging means horizontally towards and away from said first station (B) and said second station (D).

12. The apparatus of claim 5 wherein said engaging means (D) (i) comprise rotatable centers, said rotatable centers being capable of being pushed into and pulled out of each open end of a supporting rod.

13. The apparatus of claim 12, wherein pneumatic cylinders are provided for pushing and pulling said rotatable centers into and out of said open ends.

14. The apparatus of claim 5, wherein located beneath said second station (D) and said third station (F) is a conveying means for transporting foam scrap away from said apparatus.

* * * * *